United States Patent
Yajima et al.

(10) Patent No.: US 9,862,306 B2
(45) Date of Patent: Jan. 9, 2018

(54) VEHICLE DECORATIVE LIGHTING DEVICE AND VEHICLE LAMP

(71) Applicant: Stanley Electric Co., Ltd., Tokyo (JP)

(72) Inventors: Toshihiko Yajima, Tokyo (JP); Takanori Tsuchiya, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/220,218

(22) Filed: Jul. 26, 2016

(65) Prior Publication Data
US 2017/0050557 A1  Feb. 23, 2017

(30) Foreign Application Priority Data

Aug. 20, 2015  (JP) .................................. 2015-162656

(51) Int. Cl.
*F21V 5/00*  (2015.01)
*B60Q 1/24*  (2006.01)
(Continued)

(52) U.S. Cl.
CPC ............. *B60Q 1/24* (2013.01); *B60Q 1/0047* (2013.01); *B60Q 1/34* (2013.01); *B60Q 1/44* (2013.01); *F21S 48/115* (2013.01); *F21S 48/1186* (2013.01); *F21S 48/1208* (2013.01); *F21S 48/1388* (2013.01); *F21S 48/215* (2013.01); *F21S 48/2206* (2013.01);
(Continued)

(58) Field of Classification Search
USPC ........................................................ 362/520
See application file for complete search history.

(56) References Cited

U.S. PATENT DOCUMENTS 5,984,497 A  11/1999 Foerstner et al.
8,461,610 B2  6/2013 Ito et al.
(Continued)

FOREIGN PATENT DOCUMENTS

DE  10 2011 016 405 A1  10/2012
DE  10 2013 104 169 A1  10/2014
(Continued)

OTHER PUBLICATIONS

The extended European search report for the related European Patent Application No. 16182465.1 dated Jan. 30, 2017.

*Primary Examiner* — Rafferty Kelly
(74) *Attorney, Agent, or Firm* — Kenealy Vaidya LLP

(57) ABSTRACT

A vehicle decorative lighting device and a vehicle lamp including the lighting device can include a light guide lens and a light source that can emit various color lights. The light guide lens can includes a front surface including a plurality of convex surfaces so as to emit the color lights having a substantially uniform light-intensity from the front surface. The vehicle lamp can include a lamp room between an outer lens and a housing, and can incorporate various vehicle lamps such as a headlight along with the lighting device in the lamp room. The lighting device can be located in the lamp room so as to emit the color lights along a periphery of the outer lens. Thus, the disclosed subject matter can include providing vehicle lamps including the decorative lighting device having a harmonious favorable light distribution, for example, such that combine a headlight with a position lamp.

20 Claims, 6 Drawing Sheets

(51) Int. Cl.
*B60Q 1/00* (2006.01)
*F21S 8/10* (2006.01)
*B60Q 1/34* (2006.01)
*B60Q 1/44* (2006.01)
*F21Y 115/10* (2016.01)

(52) U.S. Cl.
CPC ....... *F21S 48/2237* (2013.01); *F21S 48/2268* (2013.01); *F21S 48/2287* (2013.01); *F21S 48/238* (2013.01); *F21Y 2115/10* (2016.08)

(56) References Cited

U.S. PATENT DOCUMENTS 8,786,804 B2    7/2014  Sakamoto et al.
8,870,423 B2 *  10/2014  Mihara ............... F21S 48/1241
                                                  362/507

FOREIGN PATENT DOCUMENTS

| EP | 2 525 139 A2 | 11/2012 |
| JP | 2010-272469 A | 12/2010 |
| JP | 2014-127356 A | 7/2014 |
| JP | 2015-53147 A | 3/2015 |
| WO | 2014/199563 A1 | 12/2014 |

* cited by examiner

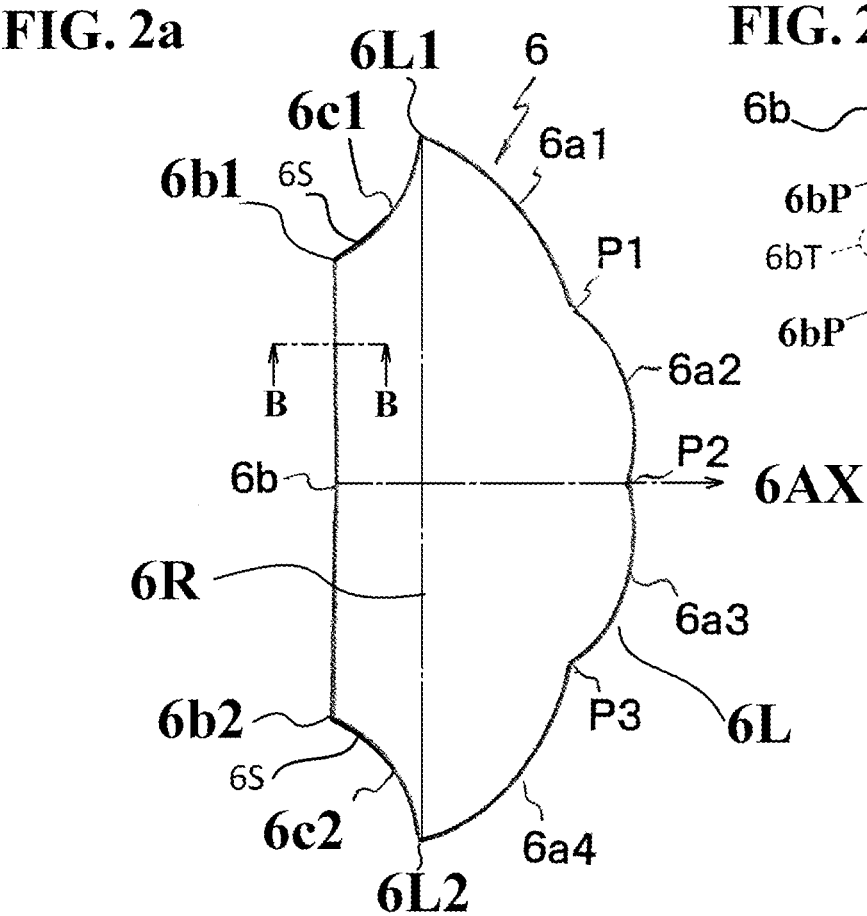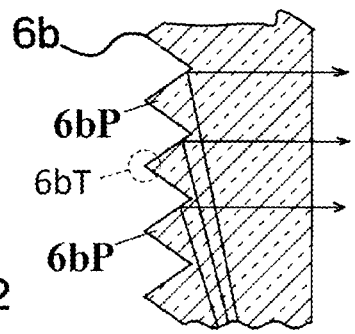

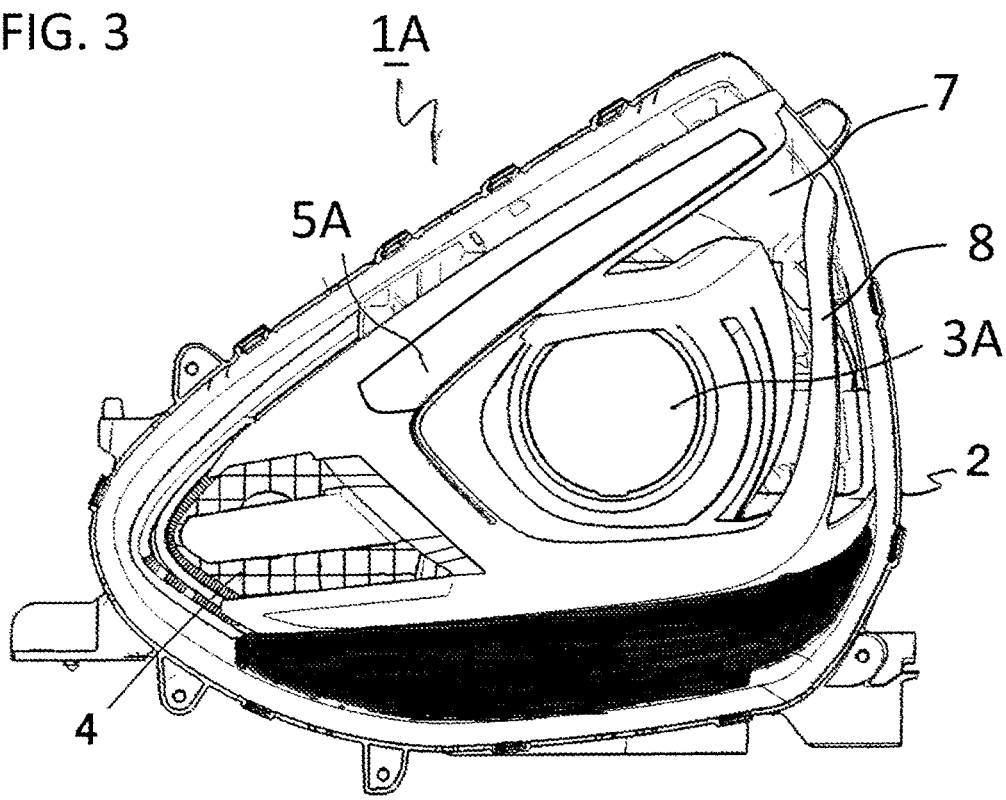

C-C Cross-sectional view

VEHICLE DECORATIVE LIGHTING DEVICE AND VEHICLE LAMP

This application claims the priority benefit under 35 U.S.C. §119 of Japanese Patent Application No. 2015-162656 filed on Aug. 20, 2015, which is hereby incorporated in its entirety by reference.

BACKGROUND

1. Field

The presently disclosed subject matter relates to vehicle decorative lighting devices and vehicle lamps including the decorative lighting device and lamps, and more particularly to the vehicle decorative lighting devices having a favorable light distribution with a simple structure, which can be substantially incorporated along an outer periphery of a vehicle lamp. Thus, a vehicle lamp that includes the decorative lighting device can have a high visual quality, which can emit harmonious light with respect to other lighting devices or lamps, and the decorative lighting lamps can be used as a position lamp when the vehicle lamps are used as a headlight.

2. Description of the Related Art

Various vehicle lamps, including decorative lighting devices that form secondary light distributions, are known as a vehicle lamp, including headlights. For example, a conventional decorative lighting device for vehicles, which can be incorporated into a vehicle lamp such as a headlight, is disclosed in Patent Document No. 1 (U.S. Pat. No. 5,984,497), which is owned by Applicant of this disclosed subject matter.

FIG. 4 is a perspective view depicting a conventional vehicle lamp including a decorative lighting device disclosed in Patent Document No. 1. The conventional vehicle lamp 10 may incorporate a headlight unit 14 along with the conventional decorative lighting device 15 in a lamp room formed between a housing 12 and an outer lens 13. The vehicle lamp 10 may be attached to a front and left portion of a vehicle from a traveling directional view of the vehicle. Another vehicle lamp attached to a front and right portion of the vehicle may be symmetrical to the vehicle lamp 10.

The conventional vehicle lamp 10 may include: the housing 12 having an opening located in a light-emitting direction of the vehicle lamp 10, and the opening inclining from a right (a middle direction of a vehicle) toward a left (a side direction of a vehicle) in an upper right direction from a front view of the vehicle lamp 10 and inclining in a rear direction of the vehicle lamp 10 from a side view of the vehicle lamp 10; the outer lens 13 made from a transparent plate, and covering the opening of the housing 12; the lamp room located between the outer lens 13 and the housing 12; the headlight unit 14 located in the lamp room so as to emit light in the light-emitting direction of the vehicle lamp 10 via the outer lens 13; and the decorative lighting device 15 located in the lamp room and along a periphery of the opening of the housing 12 so as to emit light via the outer lens 13.

FIG. 5a is a schematic front view showing the conventional decorative lighting device 15, which is incorporated into the vehicle lamp 10 shown in FIG. 4. The vehicle decorative light device 15 may include a light guide lens 16 having a first end surface 16A and a second end surface 16B, which is formed in a substantially slender U-shape, and a pair of light sources 17 located at the first and second end surfaces 16A and 16B so that each of lighting-emitting surfaces of the light sources 17 faces a respective one of the first and second end surfaces 16A and 16B.

As each of the pair of light sources 17, a light-emitting diode (LED) light source such as a white LED light source, a yellow LED light source, an amber LED light source, a red LED light source and the like can be used depending on the intended use of the decorative lighting device 15. For example, semiconductor light-emitting devices that can emit various color lights as disclosed in Patent Document No. 2 (U.S. Pat. No. 8,461,610), which is owned by Applicant of this disclosed subject matter, can be used as the LED light source.

The light guide lens 16, which is formed in a substantially laterally-facing U-shape, may include: a first linear portion 16L having the first end surface 16A located at a top portion of the light guide lens 16 and linearly extending in an extending direction of the light guide lens 16; a second linear portion 16M having the second end surface 16B located at a bottom portion of the light guide lens 16 and linearly extending in the extending direction of the light guide lens 16; a first curved portion 16R1 having a first curvature radius R1 at a central axis thereof continuously connecting to the first linear portion 16L and extending toward the second linear portion 16M; a second curved portion 16R2 having a second curvature radius R2 at a central axis thereof continuously connecting to the second linear portion 16M and extending toward the first curved portion 16R1; and a third linear portion 16N linearly extending in the extending direction of the light guide lens 16, and continuously connected between the first curved portion 16R1 and the second curved portion 16R2 so as to extend in a top and bottom direction of the light guide lens 16.

Each of the first and second end surfaces 16A and 16B may be formed in a planar shape so as to be substantially perpendicular to an outer surface and an inner surface of the light guide lens 16 in order for the light guide lens 16 to efficiently receive light emitted from the pair of light sources 17. FIG. 5b is a partial enlarged cross-sectional view depicting the light guide lens 16 used for the decorative lighting device 15, wherein the light guide lens 16 is shown as a partial enlarged cross-sectional view at a right angle with respect to an extending direction 16X of the light guide lens 16 between the first and second end surfaces 16A and 16B shown in FIG. 5a. A cross-sectional shape of the light guide lens 16 in a direction perpendicular to the extending direction 16X may be substantially rectangular.

Accordingly, a front surface of the light guide lens 16, which faces the outer lens as described in FIG. 4, may be formed in a substantially planar shape between the first and second end surfaces 16A and 16B so as to be parallel to a substantially rear surface of the light guide lens 16, which is located opposite the front surface. However, the light guide lens 16 may include a plurality of prism faces 16P on the rear surface, which is formed in a substantially planar shape. The plurality of prism faces 16P may be arranged in a longitudinal direction (16X) of the light guide lens 16, and each of the prism faces 50 may extend in a direction of a wide direction. Each cross-sectional shape of the prism faces 16P in the extending direction 16X of the light guide lens 16 may be formed in a substantially triangle shape having an apex 16T.

The light emitted from the light sources 17 may enter into the light guide lens 16 from each of the first and second end surfaces 16A and 16B, and may move in the extending direction 16X of the light guide lens 16 while it repeats internal reflections in the light guide lens 16. In this case, the light emitted from the light sources 17 may be reflected by the prism faces 16P, which are arranged in the longitudinal direction of the light guide lens 16, and may be emitted from the front surface of the light guide lens 16 and over the entire length of the light guide lens 16.

Thereby, the light guide lens 16 of the decorative lighting device 15, which is located along the periphery of the opening of the housing 12 as shown in FIG. 4, may provide a light distribution as the vehicle decorative lighting device via the outer lens 13 from the front surface of the light guide lens 16, which is the light-emitting surface of the vehicle decorative lighting device 15. In this case, as light that has entered into the light guide lens 16 from each of the first and second end surfaces 17A and 17B repeats the internal reflections in the first linear portion 16L and the second linear portion 16M, a primary light flux having a larger incident angle in a moving direction of the light may relatively decrease in the moving light, and a secondary light flux having a smaller incident angle in the moving direction of the light may relatively increase in the moving light.

Therefore, light that has entered into the first linear portion 16L from the first end surface 16A can move in the first linear portion 16L, in which a length in the extending direction X of the first linear portion 16L is longer than that of the second linear portion 16M, and therefore can enter into the first curved portion 16L in a state such that a ratio of the secondary light flux to the primary light flux is relatively large. As a result, the light that has entered into the first linear portion 16L from the first end surface 16A may smoothly move in the first curved portion 16R1 while preventing a leaked light from the first curved portion 16L in spite of a structure that the first curved portion 16L includes a small curvature radius such as a first curvature radius R1, and the light may be efficiently emitted from the front surface of the first curved portion 16L having the curvature radius R1.

Meanwhile, light that has entered into the second linear portion 16M from the second end surface 16B may move in the second linear portion 16M, and therefore may enter into the second curved portion 16R2 in a state such that a ratio of the secondary light flux to the primary light flux is relatively small. However, the light that has entered into the second linear portion 16M from the second end surface 16B may smoothly move in the second curved portion 16M while preventing a leaked light from the second curved portion 16M, and also may be efficiently emitted from the front surface of the second curved portion 16R2 having the curvature radius R2.

The above-described decorative lighting device 15 is formed in the substantially slender U-shape, and is located along the peripheral portion of the housing. Accordingly, the conventional decorative lighting device 15 may provide a high visibility and an attractive appearance. In contrast, the conventional decorative lighting device 15 may be subject to a complex structure because of the light sources 17 located adjacent the first and second end surfaces 16A and 16B, etc. Hence, a conventional vehicle lamp using a light guide, which be illuminated by entering light from an end of the light guide, is disclosed in Patent document No. 3 (Japanese Patent Application Laid Open JP 2010-272469).

FIG. 6a is a schematic front view showing the conventional vehicle lamp using a plurality of light guides, and FIG. 6b is a normal cross-sectional view in a wide direction of one of the light guides included in the vehicle lamp, which is disclosed in Patent document No. 3. The conventional vehicle lamp 20 includes: a lamp body 21: a light source holder 24 having light-emitting diodes (LEDs) 24L attached to the lamp body 21 via a fixing portion 23, and the LEDs 24L projecting from the light source holder 24 along the lamp body 21; an alignment block 25 attached to the light source holder 24; the plurality of light guides 22 each having an end surface connecting the alignment block 25, each of the end surfaces thereof facing a respective one of the LEDs 24L, and each of the light guides 22 extending in an opposite direction of the respective one of the LEDs 24L in parallel with respect to each other; and an outer lens 26 attached to the lamp body 21, wherein light emitted from the respective one of the LEDs 24L is emitted from the outer lens 26 via each of the light guides 22.

As shown in FIG. 6b, the light guide 22 includes a light-emitting surface 22A having a central axis 22AC formed in a convex shape, the central axis 22AC extending from a rear surface 22B at a right angle with respect to the rear surface 22B toward an apex of the convex shape, extending along the rear surface 22B at the right angle and the apex of the concave shape and therefore being formed in a planar shape. The rear surface 22B of the light guide 22 includes a prism surface 22BP, which is arranged in a longitudinal direction of the light guide 22 and extends in a wide direction of the light guide 22.

Accordingly, the lights emitted from the respective one of the LEDs 24L may be emitted from the outer lens 26 via each of the light guides 22, in which each of the end surfaces of the light guides 22 faces the respective one of the LEDs 24L, in common with the conventional decorative lighting device 15 incorporated into the conventional vehicle lamp 10 shown in FIG. 4.

However, the conventional vehicle lamp 20 includes the plurality of light guides 22 extending in parallel with respect to each other and the respective one of the LEDs 24L facing each of the end surfaces of the light guides 22. Each of the light guides 22 is formed in a linear shape, and also a respective one of optical axes of the LEDs 24L may generally correspond to with each of the central axes 22AC of the light guides 22 to improve optical characteristics such as a light-emitting efficiency, etc.

Accordingly, each of the light guides 22 may tend to heighten a light-intensity near each of the central axes 22AC as compared with other regions of each of the light guides 22, and therefore may cause a color variability on a light-emitting surface of each of the light guides 22 when such a structure is used as a light source for the decorative lighting device.

The above-referenced Patent Documents and additional Patent Documents are listed below and are hereby incorporated with their English specifications and abstracts in their entireties.

1. Patent Document No. 1: U.S. Pat. No. 8,870,423
2. Patent Document No. 2: U.S. Pat. No. 8,461,610
3. Patent Document No. 3: Japanese Patent Application Laid Open JP 2010-272,469
4. Patent Document No. 4: U.S. Pat. No. 8,786,804

The disclosed subject matter has been devised to consider the above and other problems, characteristics and features. Thus, exemplary embodiments of the disclosed subject matter can include vehicle decorative lighting devices which can provide a favorable light distribution having a high visibility and a high visual quality with a simple structure, and which can expand possibilities for design so as to be able to harmonize with various vehicle lamps including a vehicle decorative lighting device.

In addition, exemplary embodiments of the disclosed subject matter can include vehicle decorative lighting devices which can emit various color lights using an LED light source having a low power consumption such that the lighting devices can be incorporated into various vehicle lamps such as a headlight, a turn signal lamp, a stop lamp, etc. In this case, when the vehicle lamp is a headlight such that a white LED light source or an HID bulb is used as a light source, the vehicle decorative lighting device can emit a harmonious white light with light emitted from the headlight so as to be usable as a position lamp and the like. Also, when the vehicle lamp is configured as a stop lamp such that a red LED light source is used as a light source, the vehicle decorative lighting device can emit a harmonious red light with light emitted from the stop lamp so as to be usable as a tail lamp, etc.

SUMMARY

The presently disclosed subject matter has been devised in view of the above and other characteristics, desires, and problems in the conventional art. An aspect of the disclosed subject matter can include vehicle decorative lighting devices which can provide favorable light distribution having a high visibility and a high visual quality with a simple structure. Another aspect of the disclosed subject matter can include providing vehicle lamps including the decorative lighting devices, which can easily incorporate a headlight and the like along with the decorative lighting device because the decorative lighting device can be formed in a slender shape such that it can be incorporated into a narrow space along a periphery of an opening of a housing. The vehicle decorative lighting devices and vehicle lamps can also emit a harmonious light with respect to light emitted from other components of the vehicle decorative lighting devices and lamps.

According to an aspect of the disclosed subject matter, a vehicle decorative lighting device can include: a light source; and a light guide lens including a first linear portion, a second linear portion and a curved portion, the curved portion thereof curving along a longitudinal axis plane thereof, the first linear portion thereof having a first end surface linearly extending along the longitudinal axis plane, and continuously connecting to the curved portion at a location opposite the first end surface, the second linear portion thereof having a second end surface linearly extending along the longitudinal axis plane and continuously connecting to the curved portion at a location opposite the second end surface, a reference plane thereof having a first front end line and a second front end line connecting between the first front end line and the second front end line in a planar shape, located in a substantially parallel direction with a rear surface thereof and intersecting with the longitudinal axis plane at a substantially right angle, a front surface thereof having a first light-emitting surface, a second light-emitting surface, a third light-emitting surface, a fourth light-emitting surface, a first valley line, a second valley line and a third valley line located between the first front end line and the second front line of the reference plane, the first light-emitting surface extending between the first front end line and the first valley line in a wide direction thereof, extending along the reference plane in a longitudinal direction thereof and formed in a convex shape between the first front end line and first valley line, the second light-emitting surface extending between the first valley line and the second valley line in the wide direction thereof, extending along the reference plane in the longitudinal direction thereof and formed in a convex shape between the first valley line and the second valley line, the third light-emitting surface extending between the second valley line and the third valley line in the wide direction thereof, extending along the reference plane in the longitudinal direction thereof and formed in a convex shape between the second valley line and the thirst valley line, the fourth light-emitting surface extending between the third valley line and the second front end line in the wide direction thereof the light guide lens, extending along the reference plane in the longitudinal direction thereof and formed in a convex shape between the third valley line and the second front end line.

In addition, the light guide lens can also include the rear surface having a first rear end line and a second rear end line formed in a substantially planar shape including a plurality of prism surfaces, each of the prism surfaces arranged in the longitudinal direction thereof and extending in the wide direction thereof between the first rear end line and the second rear end line, a first reflective surface thereof formed between the first rear end line of the rear surface and the first front end line of the reference plane, extending in the longitudinal direction thereof and formed in a concave shape, a second reflective surface thereof also formed between the second rear end line and the second front end line, extending in the longitudinal direction thereof and formed in a concave shape, the longitudinal axis plane intersecting with the rear surface at a substantially right angle and also substantially intersecting with the second valley line, at least one of the first end surface of the first linear portion and the second end surface of the second linear portion thereof exposed from the light guide lens and located in a substantially parallel with both the reference plane and the longitudinal axis plane, wherein a light-emitting surface of the light source faces the at least one of the first end surface and the second end surface thereof, and an optical axis of the light source intersects with the longitudinal axis plane.

As an exemplary variation of the above-described exemplary vehicle decorative lighting device, the light guide lens can be formed in a substantially linear rod-like shape so as to linearly extend along the longitudinal axis plane thereof.

In the above-described exemplary vehicle decorative lighting devices, a cross-sectional shape of the light guide lens can be substantially symmetric with respect to the longitudinal axis plane when the cross-sectional shape is substantially parallel to the reference plane so that the device can easily emit light having a uniform light-emitting intensity from the front surface located in an upward and downward direction with respect to the longitudinal axis plane. When the light-emitting surface of the light source faces only one of the first end surface and the second end surface, the light guide lens can narrow toward either the first end surface or the second end surface, which does not face the light-emitting surface, so that the device can easily emit light having a uniform light-emitting intensity from the front surface even when the light guide lens is long. Additionally, the device can further include a reflective sheet located adjacent at least a part of at least one of the rear surface, the first reflective surface and the second reflective surface so as to improve a light-emitting efficiency thereof.

According to the above-described exemplary vehicle decorative lighting devices, while light emitted from the light source that can emit various color lights moves smoothly in the light guide lens, which can be incorporated into a narrow space along a periphery of the opening of the housing, the light can be reflected by the rear surface including the prism faces and the reflective surfaces toward the front surface and can be emitted from the front surface of the light guide lens. In this case, the lighting device can emit light having a substantially uniform light-intensity while enlarging the light in the light-emitting direction thereof from the front surface, which includes a plurality of convex light-emitting surfaces. Thus, the disclosed subject matter can provide vehicle decorative lighting devices which can provide a favorable light distribution having a high visibility and a high visual quality with a simple structure.

According to another aspect of the disclosed subject matter, an exemplary vehicle lamp including the vehicle decorative lighting device can include: a housing; an outer lens attached to an opening of the housing, and thereby a lamp room being spaced between the housing and the outer lens; a headlight located in the lamp room, and a light-emitting direction of the headlight directed toward the outer lens; a turn signal lamp located in the lamp room and located adjacent the headlight; and the decorative lighting device located from a peripheral region of the housing toward a space between the headlight and the turn signal lamp so as to be substantially L-shaped by using the curve portion of the light guide lens, wherein the decorative light device is used as a position lamp for the vehicle lamp.

In this case, the headlight can use at least one of an HID bulb and a white LED light source as a light source thereof so that the headlight can emit a harmonious white light with a white light emitted from the vehicle decorative lighting device as a position lamp. In addition, when the vehicle lamp includes a stop lamp such that a red LED light source is used as a light source, the decorative lighting device can emit a harmonious red light with light emitted from the stop lamp so as to be able to use as a tail lamp by using a red LED light source as the light sources.

According to another aspect of the disclosed subject matter, the exemplary vehicle lamps can incorporate various vehicle lamps such as a headlight and the like along with the vehicle decorative lighting device, which can be incorporated into a narrow space along a periphery of the opening of the housing in the lamp room, and which can various color lights using the LED light sources. Thus, the disclosed subject matter can also provide vehicle lamps including the vehicle decorative lighting devices, which can easily incorporate the headlight, the stop lamp and the like along with the decorative lighting device, and which can also emit a harmonious light with light emitted from the vehicle decorative lighting device.

BRIEF DESCRIPTION OF THE DRAWINGS

These and other characteristics and features of the disclosed subject matter will become clear from the following description with reference to the accompanying drawings, wherein:

FIG. 2a is a schematic enlarged cross-sectional view taken along Line A-A shown in FIG. 1 of the vehicle decorative lighting device, which is incorporated into the vehicle lamp shown in FIG. 1, and FIG. 2b is a partial enlarged cross-sectional view taken along Line B-B shown in FIG. 2a of a rear surface of a light guide lens;

FIG. 3 is a front view showing an exemplary variation of the vehicle lamp including the vehicle decorative lighting device made in accordance with principles of the disclosed subject matter;

FIG. 6b is a normal cross-sectional view in a wide direction of one of the light guides included in the conventional vehicle lamp shown in FIG. 6a.

DETAILED DESCRIPTION OF EXEMPLARY EMBODIMENTS

Figure 1:
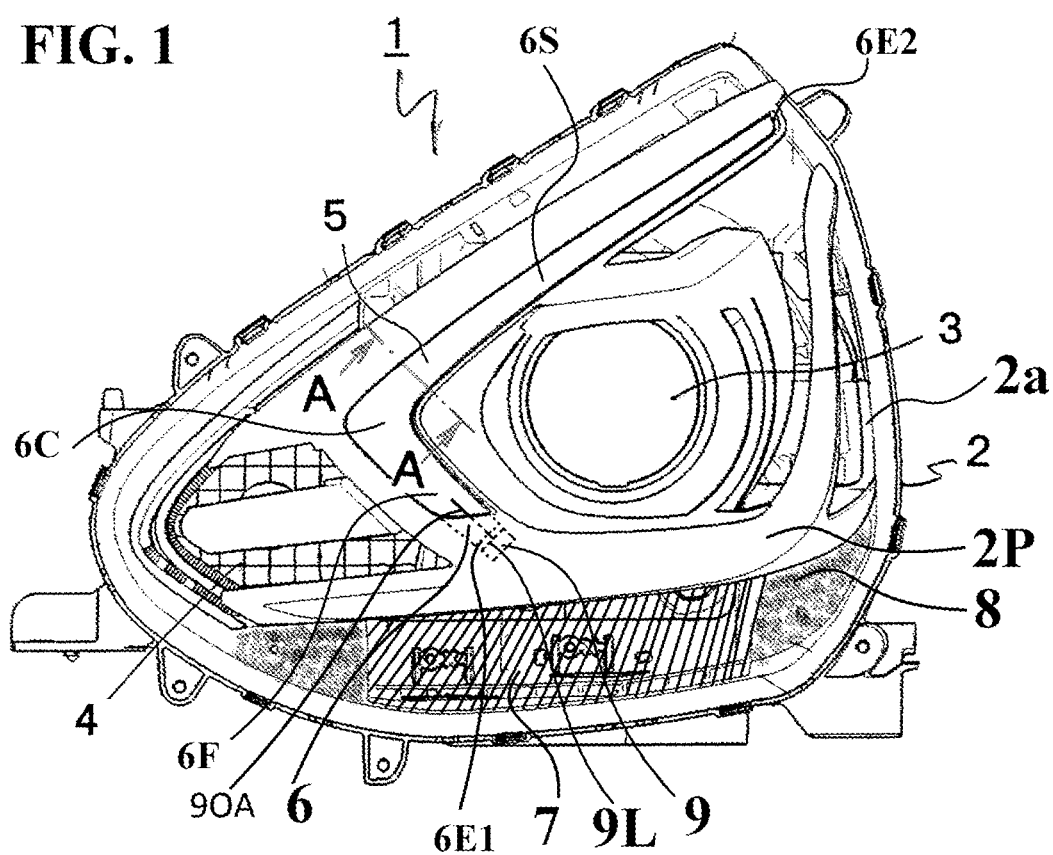
FIG. 1 is a front view showing an exemplary embodiment of a vehicle lamp including a vehicle decorative lighting device made in accordance with principles of the disclosed subject matter.
Figure 4:
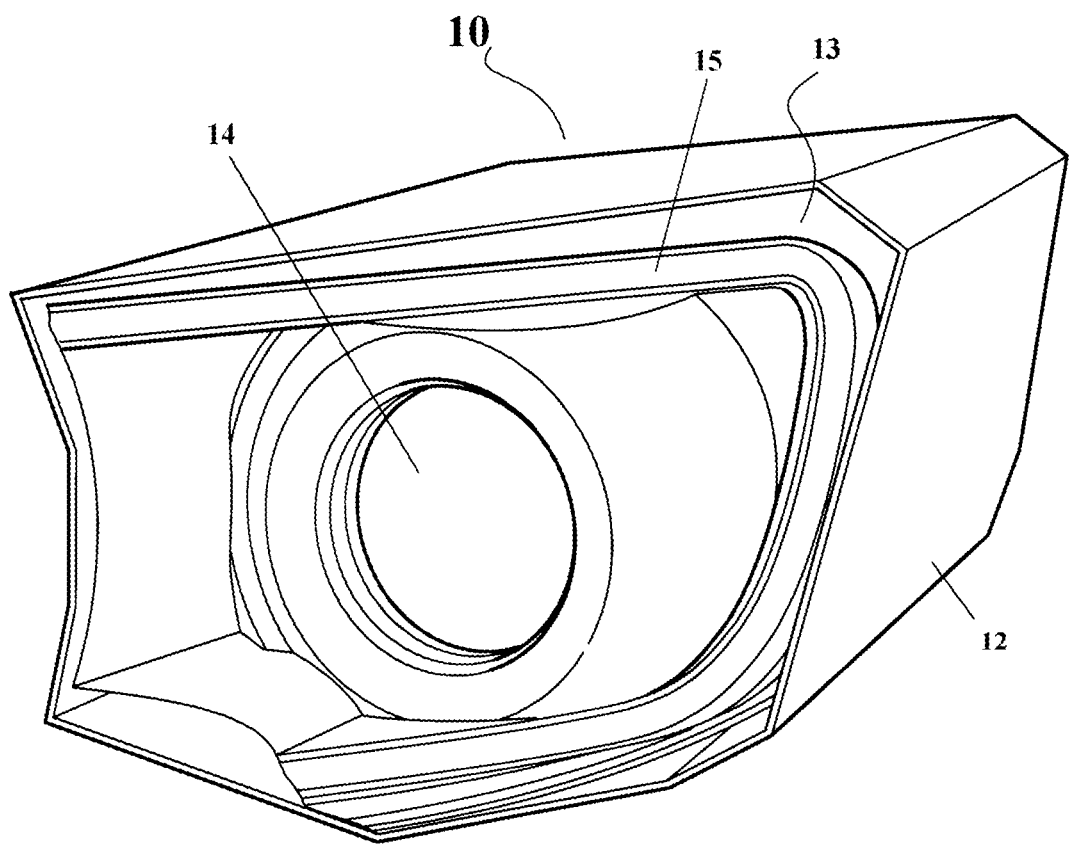
FIG. 4 is a perspective view depicting a conventional vehicle lamp including a conventional decorative lighting device.
Figure 5A:
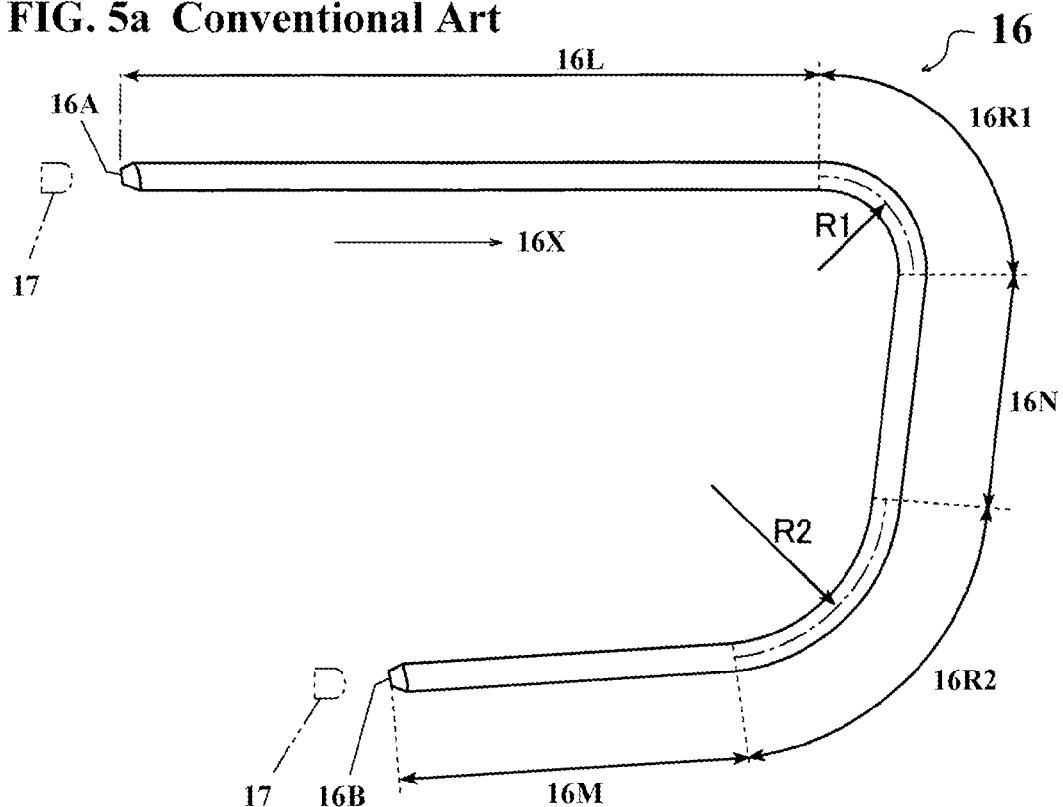
FIG. 5a is a schematic front view showing a light guide lens and a light source of the conventional decorative lighting device incorporated into the vehicle lamp shown in FIG. 4.
Figure 5B:
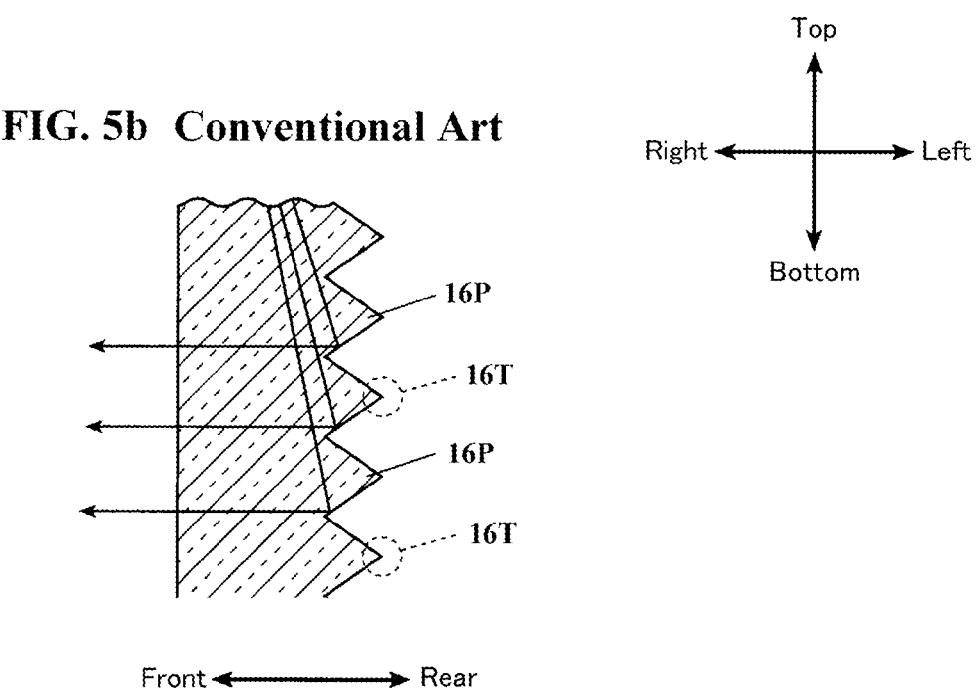
FIG. 5b is a partial enlarged cross-sectional view depicting the light guide lens used for the decorative lighting device.

The disclosed subject matter will now be described in detail with reference to FIG. 1 to FIG. 3, in which the same, similar, or corresponding elements use the same reference marks. FIG. 1 is a front view showing an exemplary embodiment of a vehicle lamp including a vehicle decorative lighting device made in accordance with principles of the disclosed subject matter. The vehicle lamp 1 can incorporate a headlight 3 and a turn signal lamp 4 along with the vehicle decorative lighting device 5 in a lamp room 7, which is an apace formed by attaching an outer lens 8 to a housing 2.

The vehicle lamp 1 can be attached to a front and left portion of a subject vehicle, and another vehicle lamp can be attached to a front and right portion of the subject vehicle, which may be substantially symmetrical to the vehicle headlight 1. Accordingly, the vehicle lamp 1, which is attached to the front and left portion of the subject vehicle, will be described with reference to FIG. 1.

The vehicle lamp 1 can include: the housing 2 having an opening 2a and a makeup panel 2P, and the opening 2a thereof inclining from a right (a middle direction of the vehicle) toward a left (a side direction of the vehicle) in an upper right direction from a front view of the vehicle lamp 1 and inclining in a rear direction of the vehicle lamp 1 from a side view of the vehicle lamp 1; the outer lens 8 covering the opening 2a of the housing 2; the lamp room 7 being a space located between the outer lens 8 and the housing 2; and the headlight 3 located in a rightward direction of the lamp room 7 so as to emit light in a light-emitting direction of the vehicle lamp 1 via the outer lens 8.

In addition, the vehicle lamp 1 can also include: the turn signal lamp 4 located in a leftward direction of the lamp room 7 so as to be recognized even from the leftward direction of the subject vehicle; and also the vehicle decorative lighting device 5 located in the lamp room 7 and located from a upper periphery of the opening of the housing 2 toward a space between the turn signal lamp 4 and the headlight 3 so as to emit light via the outer lens 8. The housing 2 can be made by casting a resin having a reflectivity such as a white poly arylate, polyethylene terephthalate, etc.

The vehicle decorative lighting device 5 can include a light guide lens 6 having a first end surface 6E1 and a second end surface 6E2 formed in a substantially L-shaped and rod-like shape, and a light source 9 having an optical axis 90A and a light-emitting surface 9L, which faces the first end surface 6E1 of the light guide lens 6 located in the lamp room 7. The light source 9 and the first end surface 6E1 of the light guide lens 6 can be covered with the makeup panel 2P so as not to be seen from a frontward direction of the vehicle lamp 1 as shown in FIG. 1. The makeup panel 2P can be made of a metallic material having a high reflectivity, and also can be made from a plastic material having a high reflectivity on which a metallic layer such as aluminum and the like is coated thereon by a vapor deposition method, etc.

The decorative lighting device 5 can return light leaked from the light guide lens 6 into the light guide lens 6 again by reflecting the leaked light using the makeup panel 2P having a high reflectivity, which is located adjacent a rear surface and the like of the light guide lens 6. The makeup panel 2P can also be located at the second end surface 6E2 of the light guide lens 6 to prevent the second surface 6E2 from leaking the light. Accordingly, the makeup panel 2P can improve a light-emitting efficiency of the decorative lighting device 5. However, the second end surface 6E2 can also be used as an incident surface for the light guide lens 6 when the decorative light device needs to emit light having a high light-intensity.

When at least one of the first end surface 6E1 of the first linear portion 6F and the second end surface 6E2 of the second linear portion 6S of the light guide lens 6 is used as an incident surface for the light guide lens 6, the at least one of the first end surface 6E1 and the second end surface 6E2 can be exposed from the light guide lens 6, and also can be located in a direction substantially perpendicular to the optical axis 90A of the light source 9 to efficiently receive light emitted from the light source 9.

In this case, when only the first end surface 6E1 of the first linear portion 6F is used as the incident surface for the light guide lens 6 and when the light guide lens 6 becomes long, a region close to the second end surface 6E2 of the second linear portion 6S, which is away from the light source 9, may become darker than the first linear portion 6F and a curved portion 6C. Accordingly, the second linear portion 6S can narrow from the curved portion 6C of the light guide lens 6 toward the second end surface 6E2 of the second linear portion 6S so that the decorative lighting device 5 can emit light having a uniform light-intensity as shown in FIG. 1.

The light guide lens 6 can include: the curved portion 6C curving along a longitudinal axis plane 6AX of the light guide lens 6, which is described later with reference to FIG. 2a; a first linear portion 6F having the first end surface 6E1 linearly extending along the longitudinal axis plane 6AX of the light guide lens 6, and continuously connecting to the curved portion 6C at a location opposite the first end surface 6E1; and the second linear portion 6S having the second end surface 6E2 linearly extending along the longitudinal axis plane 6AX of the light guide lens 6 and continuously connecting to the curved portion 6C at a location opposite the second end surface 6E2.

FIG. 2a is a schematic enlarged cross-sectional view taken along Line A-A shown in FIG. 1 of the vehicle decorative lighting device 5, which is incorporated into the vehicle lamp 1 as shown in FIG. 1. The light guide lens 6 of the vehicle decorative light device 5 can include a reference plane 6R having a first front end line 6L1 and a second front end line 6L2 connecting between the first front end line 6L1 and the second front end line 6L2 in a planar shape, and located in a substantially parallel direction with a rear surface 6b and intersecting with the longitudinal axis plane 6AX at a substantially right angle.

The light guide lens 6 can include a front surface 6L having a first light-emitting surface 6a1, a second light-emitting surface 6a2, a third light-emitting surface 6a3, a fourth light-emitting surface 6a4, a first valley line P1, a second valley line P2 and a third valley line P3, and located between the first front end line 6L1 and the second front line 6L2 of the reference plane 6R. The first light-emitting surface 6a1 can extend between the first front end line 6L1 and the first valley line P1 in a wide direction of the light guide lens 6, and also can extend along the reference plane 6R in a longitudinal direction of the light guide lens 6.

In addition, the first light-emitting surface 6a1 can be formed in a convex shape between the first front end line 6L1 and first valley line P1 in an opposite direction of the reference plane 6R. The second light-emitting surface 6a2 can extend between the first valley line P1 and the second valley line P2 in the wide direction of the light guide lens 6 so as to be located adjacent the first light-emitting surface 6a1, and also can extend along the reference plane 6R in the longitudinal direction of the light guide lens 6. The second light-emitting surface 6a2 can also be formed in a convex shape between the first valley line P1 and the second valley line P2 in the opposite direction of the reference plane 6R.

The third light-emitting surface 6a3 of the front surface 6L can extend between the second valley line P2 and the third valley line P3 in the wide direction of the light guide lens 6, and also can extend along the reference plane 6R in the longitudinal direction of the light guide lens 6 so as to be located adjacent the second light-emitting surface 6a2. The third light-emitting surface 6a3 can also be formed in a convex shape between the second valley line P2 and the thirst valley line P3 in the opposite direction of the reference plane 6R.

Moreover, the fourth light-emitting surface 6a4 of the front surface 6L can also extend between the third valley line P3 and the second front end line 6L2 in the wide direction of the light guide lens 6, extend along the reference plane 6R in the longitudinal direction of the light guide lens 6, and also can be formed in a convex shape between the third valley line P3 and the second front end line 6L2 in the opposite direction of the reference plane 6R so as to be located adjacent the third light-emitting surface 6a3.

The light guide lens 6 can include the rear surface 6b having a first rear end line 6b1 and a second rear end line 6b2, which is formed in a substantially planar shape, and which includes a plurality of prism surfaces 6bP on the rear surface 6b. FIG. 2b is a partial enlarged cross-sectional view taken along Line B-B shown in FIG. 2a of the rear surface 6b of the light guide lens 6. As shown in FIG. 2a, each of the prism surfaces 6bP can be arranged in the longitudinal direction of the light guide lens 6 and can extend in the wide direction of the light guide lens 6 between the first rear end line 6b1 and the second rear end line 6b2 of the rear surface 4b. Each cross-sectional shape of the prism surfaces 16bP at a right angle with respect to the wide direction of the light guide lens 6 can be formed in a substantially triangle shape having an apex 6bT.

In addition, the light guide lens 6 can include a first reflective surface 6c1 formed between the first rear end line 6b1 of the rear surface 6b and the first front end line 6L1 of the reference plane 6R and a second reflective surface 6c2 formed between the second rear end line 6b2 of the rear surface 6b and the second front end line 6L2 of the reference plane 6R. The first reflective surface 6c1 can extend in the longitudinal direction of the light guide lens 6, and can be formed in a concave shape toward the reference plane 6R. The second reflective surface 6c2 can also extend in the longitudinal direction of the light guide lens 6, and can be formed in a concave shape toward the reference plane 6R in common with the first reflective surface 6c1.

Moreover, the above-described longitudinal axis plane 6AX of the light guide lens 6 can intersect with the rear surface 6b at a right angle, and also can substantially intersect with the second valley line P2. The light guide lens 6 can be composed a transparent resin such as an acrylic resin, a polycarbonate resin, a polyester resin, a polyolefin resin and the like in order to be able to efficiently project light emitted from the light source 9 via the front surface 6L.

As the light source 9, a light-emitting diode (LED) light source such as a white LED light source, a yellow LED light source, an amber LED light source, a red LED light source and the like can be used depending on the intended use of the decorative lighting device. For example, semiconductor light-emitting devices, which can emit various color lights as disclosed in Patent Document No. 2, can be used as the LED light source.

The LED light source can emit light having a high light-intensity with a low power consumption, and also can be provided with a light-emitting surface having various shapes that match each shape of the first end surface 6E1 and the second end surface 6E2 of the light guide lens 6. Accordingly, when an optical axis of the LED light source intersects with the longitudinal axis plane 6AX at a substantially right angle, light emitted from the LED light source can enter into the light guide lens 6 via at least one of the first end surface 6E1 and the second end surface 6E2 of the light guide 6 with a higher efficiency.

Figure 6A:
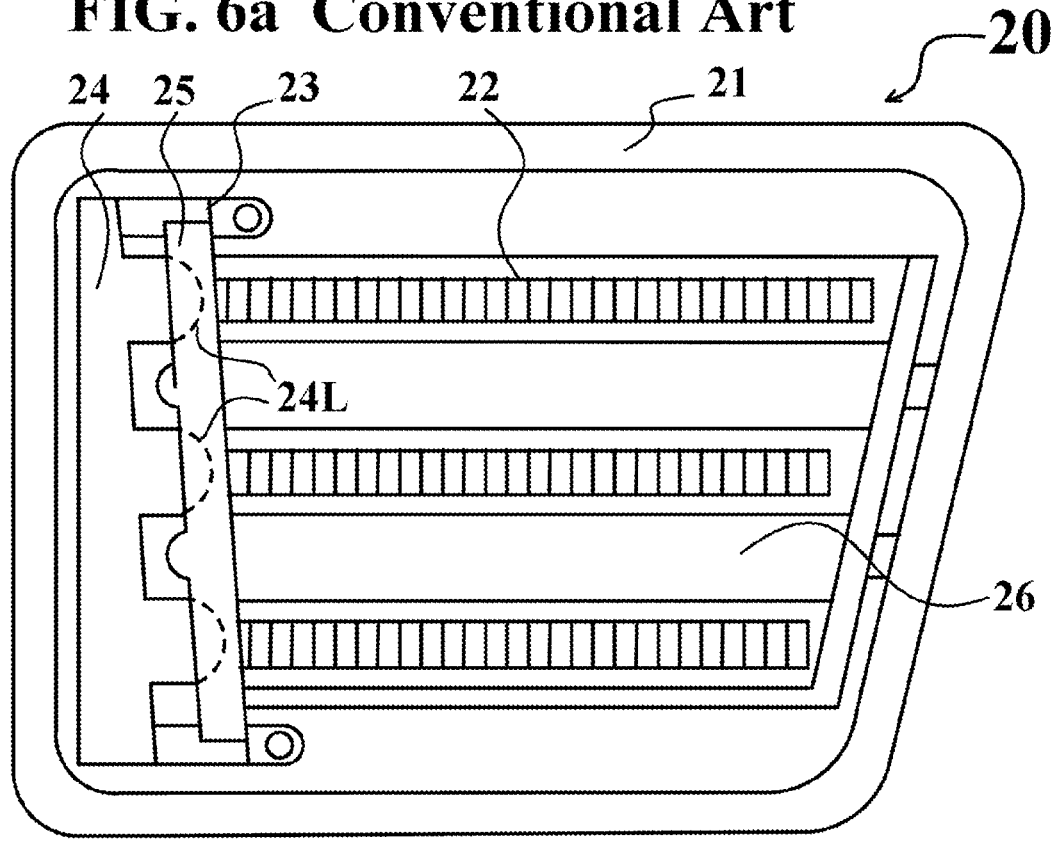
FIG. 6a is a schematic front view showing a conventional vehicle lamp using a plurality of light guides.

Therefore, because the vehicle decorative lighting device 5 of the disclosed subject matter does not need the alignment block 25 and the like as shown in FIG. 6a to concentrate light toward the at least one of the first end surface 6E1 and the second end surface 6E2 of the light guide lens 6 as compared with the conventional vehicle lamp including the light guides 22, the vehicle lamp 1 including the decorative lighting device 5 can be formed in a small size and with a simple structure.

As described above, the light guide lens 6 can include the plurality of prism faces 6bP on the rear surface 6b, which is formed in a substantially planar shape as shown in FIG. 2a. The plurality of prism faces 6bP can be arranged in the longitudinal direction of the light guide lens 6, and each of the prism faces 6bP can extend in a direction substantially perpendicular to the longitudinal direction of the light guide lens 6. Each cross-sectional shape of the prism faces 6bP in the longitudinal direction of the light guide lens 6 can be formed in a substantially triangle shape having the apex 6bT, and a pitch between adjacent apexes 6bT of the prism faces 6bP can be 0.3 millimeters or less.

In this case, the light emitted from the light sources 9 can enter into the light guide lens 6 from the at least one of the first end surface 6E1 and the second end surfaces 6E2 of the light guide lens 6, and can move in the longitudinal direction of the light guide lens 6 while it repeats internal reflections in the light guide lens 6. Additionally, the light emitted from the light sources 6 can be reflected by the prism faces 6bP, which are arranged in the longitudinal direction, and can be emitted from the front surface 6L of the light guide lens 6 and over the entire length of the light guide lens 6 formed in a substantially convex shape so as to enlarge in the light-emitting direction of the decorative light-emitting device 5.

Figure 6B:
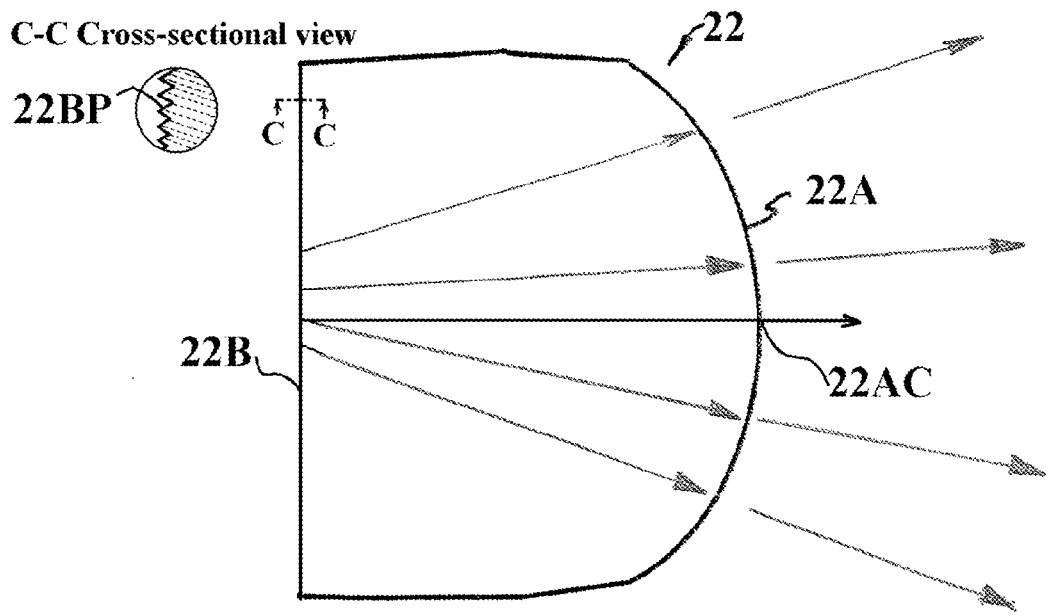

When the optical axis 90A of the LED light source 9 intersects with the longitudinal axis plane 6AX at the substantially right angle, the decorative light-emitting device 5 tends to emit light having a high light-intensity in a direction of the longitudinal axis plane 6AX as described in the conventional light guide 22 with reference to FIG. 6b. However, the decorative light-emitting device 5 of the disclosed subject matter can include the second valley P2 on the front surface 6L located in a direction of the longitudinal axis plane 6AX, and the second valley P2 can be located between the second light-emitting surface 6a2 and the third light-emitting surface 6a3, which are formed in each of the substantially convex shapes and extend in the longitudinal direction of the light guide lens 6.

Therefore, the decorative light-emitting device 5 can emit light having a substantially uniform light-intensity from the second light-emitting surface 6a2 to the third light-emitting surface 6a3 including the second valley P2. The light having the substantially uniform light-intensity can be emitted from the second light-emitting surface 6a2 to the third light-emitting surface 6a3 including the second valley P2 on the front surface 6L of the light guide lens 6 and over the second light-emitting surface 6a2 to the third light-emitting surface 6a3 including the second valley P2 of the light guide lens 6 formed in each of the substantially convex shapes so as to enlarge in the light-emitting direction of the light guide lens 6.

In addition, the decorative light-emitting device 5 tends to emit light having a higher light-intensity in directions of the first valley P1 and the third valley P3 than the first light-emitting surface 6a1 and the fourth light-emitting 6a4, because the light-emitting device 5 tends to emit light having a low light-intensity in directions of the first light-emitting surface 6a1 and the fourth light-emitting surface 6a4, which are located in outward directions of the light guide lens 6, than the second light-emitting surface 6a2 to the third light-emitting surface 6a3, which are located in an inward direction of the light guide lens 6.

However, the decorative light-emitting device 5 of the disclosed subject matter can include the first reflective surface 6c1 formed between the first rear end line 6b1 of the rear surface 6b and the first front end line 6L1 of the reference plane 6R and the second reflective surface 6c2 formed between the second rear end line 6b2 of the rear surface 6b and the second front end line 6L2 of the reference plane 6R. Thereby, the decorative light-emitting device 5 can reflect lights, which are reached to the first reflective surface 6c1 and the second reflective surface 6c2, toward the first light-emitting surface 6a1 and the fourth light-emitting 6a4 in large part.

Accordingly, the decorative light-emitting device 5 can emit the light having the substantially uniform light-intensity while enlarging the light in the light-emitting direction thereof from the front surface 6L, which includes a plurality of convex light-emitting surfaces. The decorative light-emitting device 5 can further improve the light having the substantially uniform light-intensity by forming a cross-sectional shape of the light guide lens 6 in a substantially symmetric shape with respect to the longitudinal axis plane 6AX when the cross-sectional shape of the light guide lens 6 is substantially parallel to the reference plane 6R.

In addition, the decorative light-emitting device 5 can further include a reflective sheet 6S on at least one of the rear surface 6b, the first reflective surface 6c1 and the second reflective surface 6c2 so that the light emitted from the light sources 9 can smoothly move in the light guide lens 6 while it repeats internal reflections and also can be efficiently emitted from the front surface 6L, which is a light-emitting surface of the decorative light-emitting device 5. The reflective sheet 6S can be made of a material having high reflectivity, such as polyethylene terephthalate (PET) and the like, as disclosed in Patent Document No. 4, which is owned by Applicant of this disclosed subject matter.

According to the embodiment as described above, the light emitted from the light source 9, which can emit various color lights and can efficiently move in the light guide lens 6 formed in the substantially L-shape, can be reflected toward the front surface 6L by the rear surface 6b including the prism faces 6bP, the first reflective surface 6c1 and the second reflective surface 6c2, and the light having the substantially uniform light-intensity can be emitted from the front surface 6L of the light guide lens 6. Accordingly, the disclosed subject matter can provide vehicle decorative lighting devices which can emit various color lights using an LED light source having a low power consumption such that the lighting devices can be incorporated into various vehicle lamps such as a headlight, a turn signal lamp, a stop lamp and the like.

These vehicle lamps can have favorable light distribution patterns, have high visibility and high visual quality while providing simple structures allowing ease of manufacturing as compared with the conventional vehicle lamp. In this case, the front surface 6L of the light guide lens 6 can be configured to emit the light having the substantially uniform light-emitting intensity in the light-emitting direction of the decorative light-emitting device 5 so as to fit various curved shapes of both front/rear corners of a vehicle. Thus, the disclosed subject matter can provide vehicle decorative lighting devices which can provide a favorable light distribution having a high visibility and a high visual quality with a simple structure, and which can be formed in various curved shapes in accordance with a shape of the vehicle lamp 1.

Exemplary embodiments of a case where the vehicle lamp 1 is used as a rear combination lamp will now be described with reference to FIG. 3, which is a front view showing an exemplary variation of the vehicle lamp including the vehicle decorative lighting device made in accordance with principles of the disclosed subject matter. The vehicle lamp 1A can include: a stop lamp 3A in the lamp room 7 formed between the housing 2 and the outer lens 8; the turn signal lamp in the lamp room 7; and also the decorative light-emitting device 7 in the lamp room 7.

In this case, when the vehicle lamp 1A includes the stop lamp 3A such that a red LED light source is used as a light source, the decorative lighting device 5A can emit a harmonious red light with light emitted from the stop lamp 3A so as to be able to use as a tail lamp by using a red LED light source as the light sources 6. Therefore, the vehicle lamp 1A including the stop lamp 3A and the decorative lighting device 5A can provide a harmonious favorable light distribution having a high visibility and a high visual quality with a simple structure.

According to the exemplary vehicle lamps, the exemplary vehicle lamps can incorporate various vehicle lamps such as a headlight and the like along with the decorative lighting device 5 (or 5A), which can be incorporated into a narrow space along a periphery of the opening of the housing 2 in the lamp room 7, and which can various color lights using the LED light sources. Thus, the disclosed subject matter can also provide vehicle lamps including the vehicle decorative lighting devices, which can easily incorporate various vehicle lamps such as a low beam headlight, a high beam headlight and the like along with the decorative lighting device, and which can also emit a harmonious light with light emitted from the vehicle decorative lighting device 5 (or 5A).

Various modifications of the above disclosed embodiments can be made without departing from the spirit and scope of the presently disclosed subject matter. For example, cases where the light guide lens 6 of the decorative lighting device 5 is formed in each of the substantially L-shape and the linear shape are described. However, the light guide lens is not limited to this shape and can be formed in various shapes such as a C-shape formed in a nearly ring shape, a rectangular ring shape which can be formed by combining each of the above-described light guide lens 5 and 5A. In addition, the specific arrangement between components can vary between different applications, and several of the above-described features can be used interchangeably between various embodiments depending on a particular application of the device.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A vehicle decorative lighting device, comprising:
a light guide lens having a front surface, a rear surface, a first reflective surface, a second reflective surface, a reference plane and a longitudinal axis plane including a first linear portion, a second linear portion and a curved portion, the curved portion of the light guide lens curving along the longitudinal axis plane of the light guide lens,
the first linear portion of the light guide lens having a first end surface linearly extending along the longitudinal axis plane of the light guide lens, and continuously connecting to the curved portion at a location opposite the first end surface, the second linear portion of the light guide lens having a second end surface linearly extending along the longitudinal axis plane of the light guide lens and continuously connecting to the curved portion at a location opposite the second end surface,
the reference plane having a first front end line and a second front end line connecting between the first front end line and the second front end line in a planar shape, located in a substantially parallel direction with the rear surface and intersecting with the longitudinal axis plane at a substantially right angle,
the front surface having a first light-emitting surface, a second light-emitting surface, a third light-emitting surface, a fourth light-emitting surface, a first valley line, a second valley line and a third valley line located between the first front end line and the second front line of the reference plane, the first light-emitting surface extending between the first front end line and the first valley line in a wide direction of the light guide lens, extending along the reference plane in a longitudinal direction of the light guide lens, and formed in a convex shape between the first front end line and first valley line in an opposite direction of the reference plane, the second light-emitting surface extending between the first valley line and the second valley line in the wide direction of the light guide lens, extending along the reference plane in the longitudinal direction of the light guide lens, and formed in a convex shape between the first valley line and the second valley line in the opposite direction of the reference plane, the third light-emitting surface extending between the second valley line and the third valley line in the wide direction of the light guide lens, extending along the reference plane in the longitudinal direction of the light guide lens, and formed in a convex shape between the second valley line and the thirst valley line in the opposite direction of the reference plane, the fourth light-emitting surface extending between the third valley line and the second front end line in the wide direction of the light guide lens, extending along the reference plane in the longitudinal direction of the light guide lens, and formed in a convex shape between the third valley line and the second front end line in the opposite direction of the reference plane, the rear surface having a first rear end line and a second rear end line formed in a substantially planar shape including a plurality of prism surfaces, each of the prism surfaces arranged in the longitudinal direction of the light guide lens and extending in the wide direction of the light guide lens between the first rear end line and the second rear end line, the first reflective surface formed between the first rear end line of the rear surface and the first front end line of the reference plane, extending in the longitudinal direction of the light guide lens, and formed in a concave shape toward the reference plane, the second reflective surface formed between the second rear end line of the rear surface and the second front end line of the reference plane, extending in the longitudinal direction of the light guide lens, and formed in a concave shape toward the reference plane, the longitudinal axis plane intersecting with the rear surface at a substantially right angle, and also substantially intersecting with the second valley line, at least one of the first end surface of the first linear portion and the second end surface of the second linear portion of the light guide lens exposed from the light guide lens, and located in a substantially parallel with both the reference plane and the longitudinal axis plane; and a light source having a light-emitting surface and an optical axis, the light-emitting surface of the light source facing the at least one of the first end surface of the first linear portion and the second end surface of the second linear portion of the light guide lens, which is exposed from the light guide lens, wherein the optical axis of the light source intersects with the longitudinal axis plane.

2. The vehicle decorative lighting device according to claim 1, wherein a cross-sectional shape of the light guide lens is substantially symmetric with respect to the longitudinal axis plane when the cross-sectional shape of the light guide lens is substantially parallel to the reference plane.

3. The vehicle decorative lighting device according to claim 1, further comprising:
a reflective sheet being located adjacent at least a part of at least one of the rear surface, the first reflective surface and the second reflective surface.

4. The vehicle decorative lighting device according to claim 1, wherein when the light-emitting surface of the light source faces one of the first end surface of the first linear portion and the second end surface of the second linear portion of the light guide lens, either the first linear portion or the second linear portion narrows from the curved portion of the light guide lens toward either the first end surface of the first linear portion or the second end surface of the second linear portion, which does not face the light-emitting surface of the light source.

5. A vehicle lamp including the vehicle decorative lighting device according to claim 1, comprising:
a housing having an opening;
an outer lens attached to the opening of the housing, and thereby a lamp room being spaced between the housing and the outer lens;
a headlight having a light-emitting direction located in the lamp room, and the light-emitting direction of the headlight directed toward the outer lens;
a turn signal lamp located in the lamp room and located adjacent the headlight; and
the decorative lighting device located from a peripheral region of the housing toward a space between the headlight and the turn signal lamp so as to be substantially L-shaped by using the curve portion of the light guide lens, wherein the decorative light device is used as a position lamp for the vehicle lamp.

6. The vehicle lamp according to claim 5, wherein a cross-sectional shape of the light guide lens is substantially symmetric with respect to the longitudinal axis plane when the cross-sectional shape of the light guide lens is substantially parallel to the reference plane.

7. The vehicle lamp according to claim 5, further comprising:
a reflective sheet being located adjacent at least a part of at least one of the rear surface, the first reflective surface and the second reflective surface.

8. The vehicle lamp according to claim 5, when the light-emitting surface of the light source faces one of the first end surface of the first linear portion and the second end surface of the second linear portion of the light guide lens, either the first linear portion or the second linear portion narrows from the curved portion of the light guide lens toward either the first end surface of the first linear portion or the second end surface of the second linear portion, which does not face the light-emitting surface of the light source.

9. A vehicle decorative lighting device, comprising:
a light guide lens having a first end surface, a second end surface, a front surface, a rear surface, a first reflective surface, a second reflective surface, a reference plane and a longitudinal axis plane formed in a substantially linear rod-like shape, and linearly extending along the longitudinal axis plane of the light guide lens,
the reference plane having a first front end line and a second front end line connecting between the first front end line and the second front end line in a planar shape, located in a substantially parallel direction with the rear surface and intersecting with the longitudinal axis plane at a substantially right angle,
the front surface having a first light-emitting surface, a second light-emitting surface, a third light-emitting surface, a fourth light-emitting surface, a first valley line, a second valley line and a third valley line located between the first front end line and the second front line of the reference plane, the first light-emitting surface extending between the first front end line and the first valley line in a wide direction of the light guide lens, extending along the reference plane in a longitudinal direction of the light guide lens, and formed in a convex shape between the first front end line and first valley line in an opposite direction of the reference plane, the second light-emitting surface extending between the first valley line and the second valley line in the wide direction of the light guide lens, extending along the reference plane in the longitudinal direction of the light guide lens, and formed in a convex shape between the first valley line and the second valley line in the opposite direction of the reference plane, the third light-emitting surface extending between the second valley line and the third valley line in the wide direction of the light guide lens, extending along the reference plane in the longitudinal direction of the light guide lens, and formed in a convex shape between the second valley line and the thirst valley line in the opposite direction of the reference plane, the fourth light-emitting surface extending between the third valley line and the second front end line in the wide direction of the light guide lens, extending along the reference plane in the longitudinal direction of the light guide lens, and formed in a convex shape between the third valley line and the second front end line in the opposite direction of the reference plane, the rear surface having a first rear end line and a second rear end line formed in a substantially planar shape including a plurality of prism surfaces, each of the prism surfaces arranged in the longitudinal direction of the light guide lens and extending in the wide direction of the light guide lens between the first rear end line and the second rear end line, the first reflective surface formed between the first rear end line of the rear surface and the first front end line of the reference plane, extending in the longitudinal direction of the light guide lens, and formed in a concave shape toward the reference plane, the second reflective surface formed between the second rear end line of the rear surface and the second front end line of the reference plane, extending in the longitudinal direction of the light guide lens, and formed in a concave shape toward the reference plane, the longitudinal axis plane intersecting with the rear surface at a substantially right angle, and also substantially intersecting with the second valley line at least one of the first end surface of the first linear portion and the second end surface of the second linear portion of the light guide lens exposed from the light guide lens, and located in a substantially parallel with both the reference plane and the longitudinal axis plane; and a light source having a light-emitting surface and an optical axis, the light-emitting surface of the light source facing the at least one of the first end surface and the second end surface of the light guide lens, which is exposed from the light guide lens, wherein the optical axis of the light source intersects with the longitudinal axis plane.

10. The vehicle decorative lighting device according to claim 9, wherein a cross-sectional shape of the light guide lens is substantially symmetric with respect to the longitudinal axis plane when the cross-sectional shape of the light guide lens is substantially parallel to the reference plane.

11. The vehicle decorative lighting device according to claim 9, further comprising:
a reflective sheet being located adjacent at least a part of at least one of the rear surface, the first reflective surface and the second reflective surface.

12. The vehicle decorative lighting device according to claim 9, wherein when the light-emitting surface of the light source faces one of the first end surface and the second end surface of the light guide lens, the light guide lens narrows toward either the first end surface or the second end surface, which does not face the light-emitting surface of the light source.

13. A vehicle lamp including the vehicle decorative lighting device according to claim 9, comprising:
a housing having an opening;
an outer lens attached to the opening of the housing, and thereby a lamp room being spaced between the housing and the outer lens;
a headlight having a light-emitting direction located in the lamp room, and the light-emitting direction of the headlight directed toward the outer lens;
a turn signal lamp located in the lamp room and located adjacent the headlight; and
at least one the decorative lighting device located from a peripheral region of the housing, wherein the decorative lighting device is used as a position lamp for the vehicle lamp.

14. A vehicle lamp including the vehicle decorative lighting device according to claim 9, comprising:
a housing having an opening;
an outer lens attached to the opening of the housing, and thereby a lamp room being spaced between the housing and the outer lens;
a tail lamp having a light-emitting direction located in the lamp room, and the light-emitting direction of the tail lamp directed toward the outer lens;
a turn signal lamp located in the lamp room and located adjacent the tail lamp; and
at least one the decorative lighting device located from a peripheral region of the housing, wherein the decorative lighting device is used as a stop lamp for the vehicle lamp.

15. A vehicle lamp including the vehicle decorative lighting device according to claim 9, comprising:
a housing having an opening;
an outer lens attached to the opening of the housing, and thereby a lamp room being spaced between the housing and the outer lens;
a stop lamp having a light-emitting direction located in the lamp room, and the light-emitting direction of the stop lamp directed toward the outer lens;
a turn signal lamp located in the lamp room and located adjacent the stop lamp; and
at least one the decorative lighting device located from a peripheral region of the housing, wherein the decorative lighting device is used as a tail lamp for the vehicle lamp.

16. The vehicle lamp according to claim 13, wherein a cross-sectional shape of the light guide lens is substantially symmetric with respect to the longitudinal axis plane when the cross-sectional shape of the light guide lens is substantially parallel to the reference plane.

17. The vehicle lamp according to claim 14, wherein a cross-sectional shape of the light guide lens is substantially symmetric with respect to the longitudinal axis plane when the cross-sectional shape of the light guide lens is substantially parallel to the reference plane.

18. The vehicle lamp according to claim 15, wherein a cross-sectional shape of the light guide lens is substantially symmetric with respect to the longitudinal axis plane when the cross-sectional shape of the light guide lens is substantially parallel to the reference plane.

19. The vehicle lamp according to claim 13, further comprising:
a reflective sheet being located adjacent at least a part of at least one of the rear surface, the first reflective surface and the second reflective surface.

20. The vehicle lamp according to claim 13, wherein when the light-emitting surface of the light source faces one of the first end surface and the second end surface of the light guide lens, the light guide lens narrows toward either the first end surface or the second end surface, which does not face the light-emitting surface of the light source.

\* \* \* \* \*